March 7, 1950 O. L. LONG Re. 23,202

CHILD'S UNDERSHIRT

Original Filed June 12, 1945 2 Sheets-Sheet 1

INVENTOR.
Olive L. Long:
BY Victor J. Evans & Co.
ATTORNEYS

March 7, 1950 O. L. LONG Re. 23,202

CHILD'S UNDERSHIRT

Original Filed June 12, 1945 2 Sheets-Sheet 2

INVENTOR.
Olive L. Long:
BY Victor J. Evans & Co.
ATTORNEYS

Reissued Mar. 7, 1950

Re. 23,202

UNITED STATES PATENT OFFICE 23,202

CHILD'S UNDERSHIRT

Olive L. Long, Mesa, Ariz.

Original No. 2,433,915, dated January 6, 1948, Serial No. 599,026, June 12, 1945. Application for reissue July 9, 1948, Serial No. 37,827

3 Claims. (Cl. 2—111)

Matter enclosed in heavy brackets [ ] appears in the original patent but forms no part of this reissue specification; matter printed in italics indicates the additions made by reissue My present invention, in its broad aspect, has to do with improvements in children's undergarments, and more particularly, it is my purpose to provide a one-piece undergarment which is dressed on the child from the front, thereby eliminating the twisting and turning of the child's arms, and which is constructed to have the sleeves positioned to go about the arms from the front, also my undergarment wraps around the child from front to back and is crossed in the back to have a double thickness over the spine and the securing and closing ends then come forward and are pinned or seamed together in front so that a child, in lying on its back, will not be rendered uncomfortable, or chafed, or scratched by contact with the pin or other securing means. The garment is very simply constructed of one piece and is so formed that washing is simplified and may be more quickly accomplished, and there are no parts likely to form uncomfortable seams or the like. Furthermore, by its formation all parts of the material of the undergarment fit the child with the desired degree of uniform snugness or looseness, as the case may be.

Other and equally important objects and advantages of my invention will be apparent from the following description and drawings, and it is pointed out that changes in form, size, shape, materials, and construction and arrangement of parts are permissible and within the purview of my broad inventive concept, and the scope of the appended claims.

In the drawings, wherein I have illustrated a preferred form of my invention:

In the drawings, wherein like characters of reference are used to designate like or similar parts.

Figure 1:
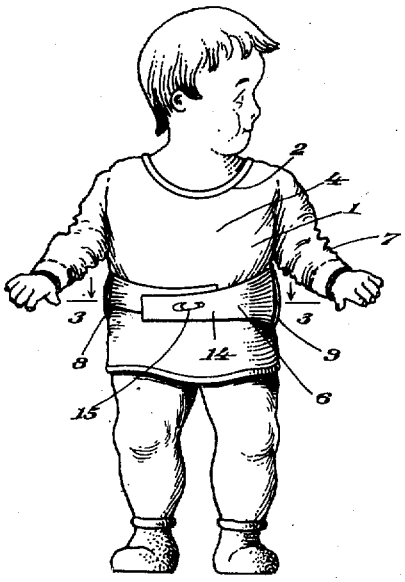
Figure 1 is a front view of a child wearing the garment.
Figure 2:
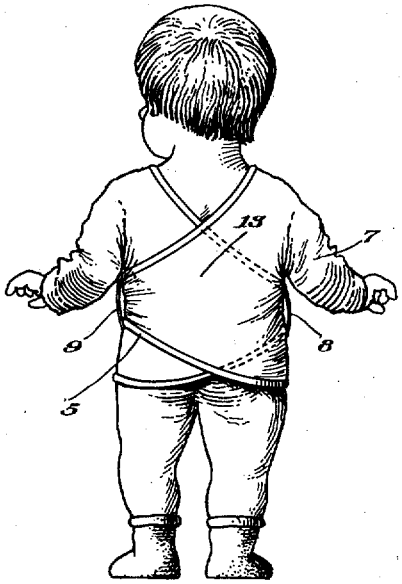
Figure 2 is a back view.
Figure 3:
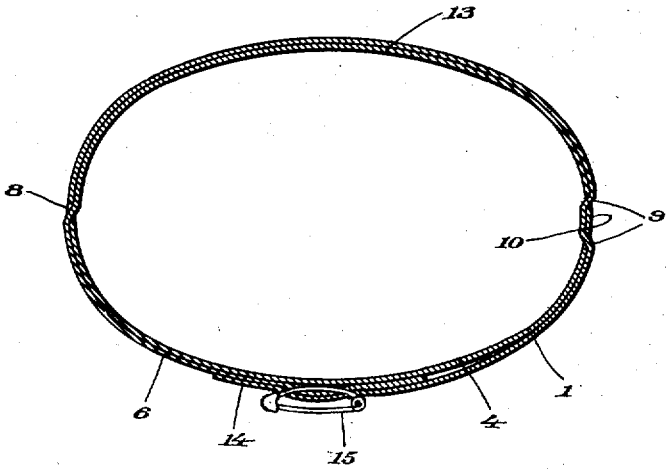
Figure 3 is a transverse section on the line 3—3 of Figure 1.
Figure 4:
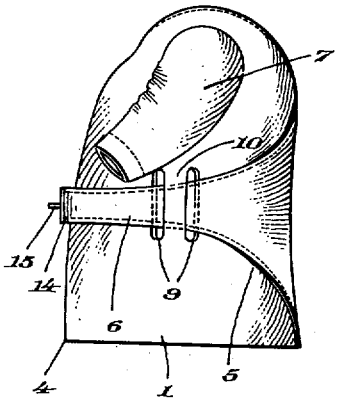
Figure 4 is a view from one side.
Figure 5:
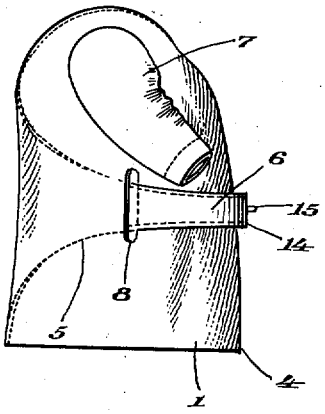
Figure 5 is a view from the other side.
Figure 6:
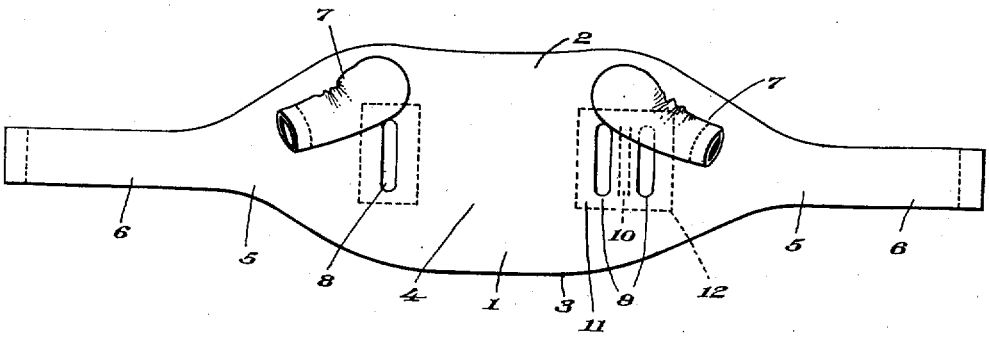
Figure 6 is a view of the garment opened up and laid out flat.

Referring to Figure 6, the body 1 of my undergarment is curved at its edges, being slightly curved in or concave as at 2, at the top, and slightly rounded or convex as at 3, at the bottom. At about the middle point 4 of the body is the front of the garment which goes over the child's chest and stomach, as shown in Figures 1, 2, 4, and 5. The ends of the body taper outwardly toward each other, as at 5, to form securing or attaching straps 6. Sleeves 7 are attached to the *garment body 1* [body] near the top at each side of the child's chest *and connected to appropriate armholes. These sleeves are so formed as* to be comfortably placed on a child's arms from the front, without twisting, and beneath and somewhat spaced from the sleeve on one side is a single vertical slot 8, and beneath the sleeve on the other side are double vertical spaced slots 9, forming a loop 10 therebetween. The material about the slots is reinforced, as at 11, by a piece of material stitched thereto, as at 12. *As shown most clearly in Figs. 1 and 2, the upper edge of the body 1 forms a neck line, which defines shoulder coverings.*

In operation the child is placed in front of and facing the person dressing it and the body 1 of the garment centered on the chest and abdomen and the arms held forward to receive the sleeves. The body 1 is then turned on each side about the child's body and overlapped, as at 13, and the slots are then below the arm pits at the sides. One of the straps 6 is run through the single slot 8, and the other through the double slots 9, and under and through the loop 10. The ends are then brought together, as at 14, and pulled to give the correct snugness, and to eliminate wrinkles, and the ends are overlapped in front and pinned together, as at 15.

From the foregoing, it is believed that the operation and advantages of my invention will be apparent, but it is again pointed out that interpretation of the scope of my invention should only be conclusive when made in the light of the subjoined claims.

I claim:

1. A child's undergarment, comprising an elongated elliptical shaped body part adjusted to be positioned over a child's chest and abdomen from the front of the child, the outer edges of the body being curved toward each other along the top and bottom thereof to provide securing straps, the upper edge of the body being curved inwardly and the bottom edge curved downwardly, sleeves mounted on the body to be placed on the arms from the front, the end parts going about the child and overlapping each other at the back, and the terminal ends reduced in width and extending from the medial line thereof in opposed relation to each other to form securing straps, the body at the sides formed with double spaced vertical slots on one side of the body and a single vertical slot on the other side of the body to receive the straps said double slots being separated by a vertical loop and the material about the slots is reinforced, said slots being respectively under and spaced from the sleeves, with the sleeves toward the ends of the body at each side, and the straps turned about the child's body to overlap in front, and means for attaching the strap ends together in front of the child's body.

2. *In a child's garment: a body portion encompassing the trunk and covering the shoulder of a wearer, the side edges of the body portion being overlapped at the rear of the garment; sleeves attached to the body portion near the upper edge of the body portion, and the two sleeves diverging from each other in a downward direction away from the upper edge, said sleeves and body portion being thereby placeable on the wearer from the front by first passing the arms through the sleeves and then overlapping the side edges of the body portion at the back; said body portion including shoulder-covering areas; and straps respectively attached to the side edges of the body portion; said body portion having a slot, one of said straps passing through said slot.*

3. *In a child's garment: a body portion encompassing the trunk and covering the shoulders of a wearer, the side edges of the body portion being overlapped at the rear of the garment; said*

*body portion having armholes adjacent the upper edge of the body portion; sleeves attached to the armholes, the two sleeves diverging from each other in a downward direction away from the upper edge; said sleeves and body portion being thereby in such position that the garment may be donned from the front by passing the child's arms through the armholes when the central part of the body portion overlies the front of the child's body; and straps respectively attached to the side edges of the body portion; said body portion having a slot, one of said straps passing through said slot.*

OLIVE L. LONG.

REFERENCES CITED

The following references are of record in the file of this patent or the original patent:

UNITED STATES PATENTS

| Number | Name | Date |
|---|---|---|
| 851,258 | Sharp | Apr. 23, 1907 |
| 881,640 | Wimmel | Mar. 10, 1908 |
| 919,740 | Magnus | Apr. 27, 1909 |
| 2,051,685 | Dickson | Aug. 18, 1936 |